United States Patent Office 3,302,981
Patented Feb. 7, 1967

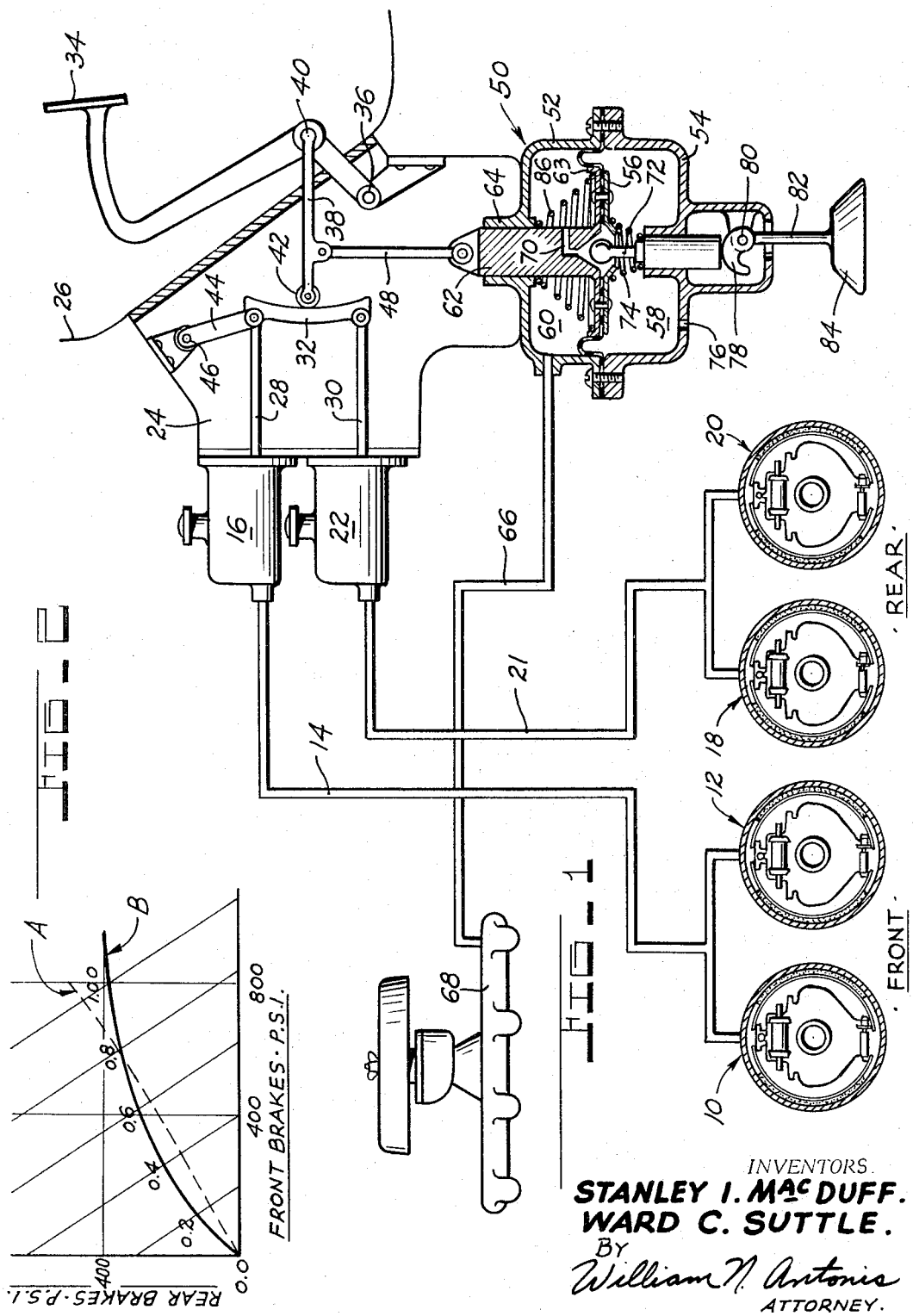

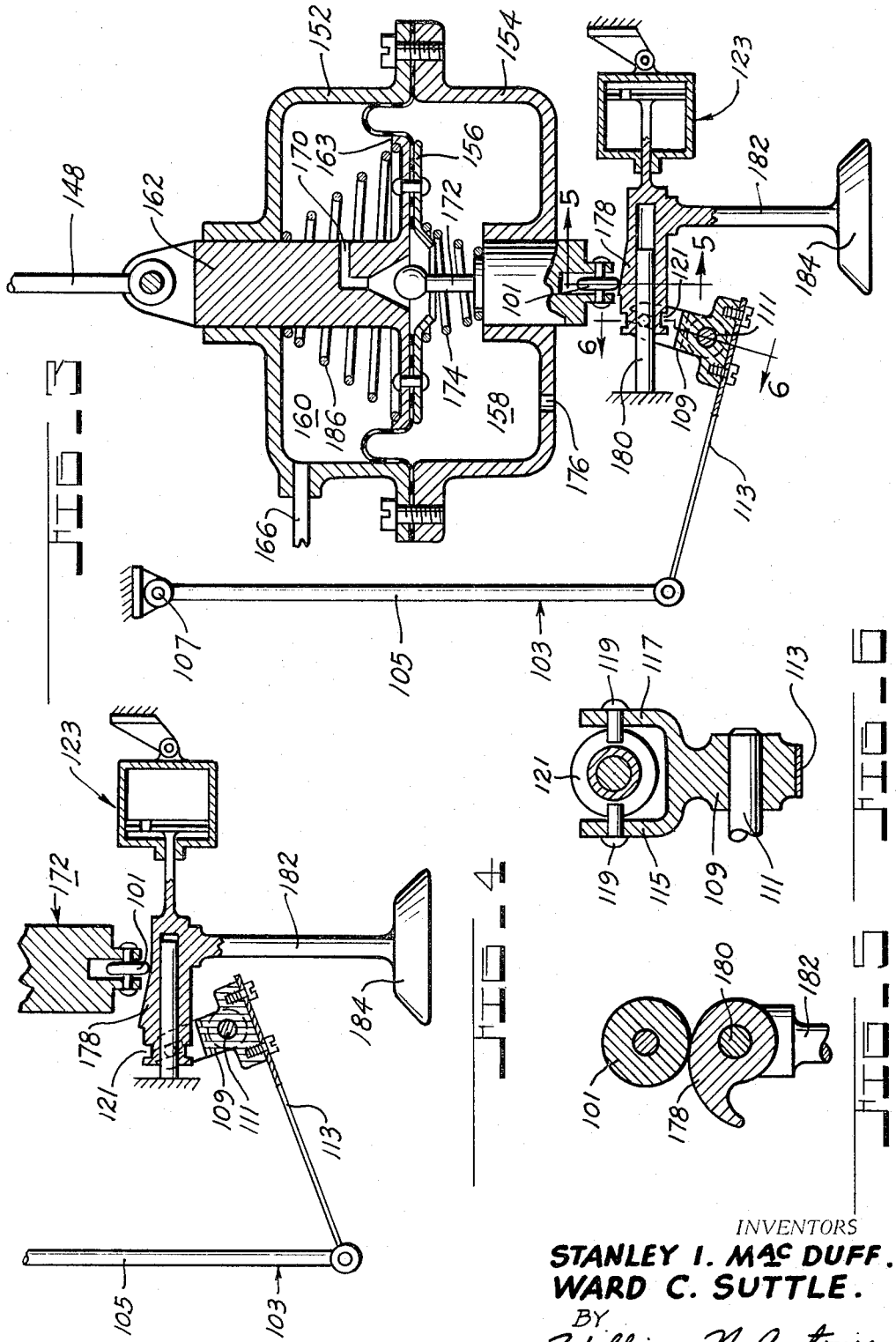

3,302,981
BRAKE PROPORTIONING SYSTEM
Stanley I. MacDuff and Ward C. Suttle, South Bend, Ind., assignors to The Bendix Corporation, a corporation of Delaware
Filed Feb. 17, 1966, Ser. No. 528,294
16 Claims. (Cl. 303—6)

This invention relates to a braking system for vehicles and, more particularly, to a brake proportioning system wherein the braking pressure ratio between the front and rear wheels is varied in proportion to the deceleration of the vehicle during application of the brakes.

It is well known in the automotive art that the effective braking effort of which a vehicle wheel is capable is dependent upon the weight carried by that particular wheel and the coefficient of friction between the wheel and the road. It is also known that the proportion of the weight of the vehicle that is borne by the wheels of a given axle or a given pair of wheels does not remain static. As the vehicle is braked, a couple is developed which results in a percentage of the weight of the car borne by the rear wheels being transferred to the front wheels. In other words, a shift of the vehicle weight from rear to front occurs when the vehicle is decelerated by means of the brakes. The amount of the weight transfer for a given vehicle is dependent upon the magnitude of the deceleration. Due to this weight shift, it is desirable to actuate the front and rear brakes at varying ratios if "optimum" braking is to be obtained. By "optimum" braking, it is meant that all of the potential tractive forces which the tires can exert against the road surface are being utilized.

Various devices have heretofore been proposed which are responsive to deceleration and which serve to limit the brake pressure applied to the rear wheels upon the attainment of a predetermined rate of deceleration. The apparent object of such devices is to permit the greatest application of braking pressure to the front wheels before skidding will result at the rear wheels. Premature rear wheel skidding substantially reduces the coefficient of friction between the rear wheels and the ground, and can result in loss of control of the vehicle. When the rear wheels skid first they tend to overrun the front wheels and cause spin. It is therefore highly beneficial to the maintenance of control of the vehicle during braking to assure that the rear wheels do not skid prior to the front wheels. On the other hand, the maximum braking effort of which both front and rear wheels are capable must be utilized if the vehicle is to be stopped within the shortest possible distance.

In spite of the various devices which have been proposed, most vehicles today still have a fixed ratio of actuation between the front and rear brakes. Such a fixed ratio results in optimum braking only at one rate of deceleration.

Accordingly, it is an object of this invention to provide a brake proportioning system which will provide optimum braking at all times by varying the braking pressure ratio between the front and rear wheels.

Another object of this invention is to provide a brake proportioning system for a vehicle which is responsive to the deceleration of the vehicle and will automatically and continuously compensate therefor.

Since the relationship of force to produce a given acceleration is directly proportional to the acceleration, it is an object of this invention to use an accelerometer for the purpose of determining the desired ratio between front and rear braking pressure and provide mechanism whereby the accelerometer can directly control this ratio.

More particularly, a further object of this invention is to provide a brake proportioning system which includes regulating means for varying the braking pressure ratio between the front and rear wheel brakes, a servo-mechanism for modifying the action of the regulating means, an accelerometer for continuously measuring the deceleration of the vehicle, and function generating means for receiving inputs from said accelerometer and programming outputs to said servomechanism so as to control the braking pressure ratio between the front and rear wheel brakes in accordance with predetermined ideal braking requirements.

A still further object of this invention is to provide a brake proportioning system of the foregoing type which includes mechanism connected to the function generating means for varying the output thereof in accordance with the load carried by the vehicle.

Another object of this invention is to provide a brake proportioning system of the foregoing type wherein the servomechanism includes a pressure differential motor and a control valve for controlling fluid pressure in the motor and the function generating means comprises cam means for causing movement of the control valve.

The above and other objects and features of this invention will become apparent from the following description taken in connection with the accompanying drawings which form a part of this disclosure and in which:

FIGURE 1 is a diagrammatic illustration of a motor vehicle braking system which includes the invention, along with certain other vehicle components essential to the operation of this system;

FIGURE 2 is a graph of ideal braking proportions contrasted to the usual fixed ratio proportioning provided in most automobiles today.

FIGURES 3 and 4 are diagrammatic illustrations of a portion of a braking system similar to that of FIGURE 1, which illustrate another embodiment of the invention in two positions;

FIGURE 5 is a sectional view taken along line 5—5 of FIGURE 3; and

FIGURE 6 is a sectional view taken along line 6—6 of FIGURE 3.

Referring to FIGURE 1 it will be noted that numerals 10 and 12 designate hydraulic brakes on the front axle of the vehicle. These brakes may be actuated by pressure in a conduit 14 leading from a master cylinder 16. The numerals 18 and 20 designate hydraulic brakes mounted upon the rear axle of the vehicle. Pressure in a conduit 21 leading from a master cylinder 22 will apply these brakes. The master cylinders 16 and 22, which are of a conventional type, are shown mounted on a common bracket 24 which is secured to the floor board or fire wall 26 of the vehicle. Each of the master cylinders is actuated by a push rod 28 and 30, respectively, the ends of which are connected together by a walking beam 32. A brake pedal 34 is pivoted on the bracket 24 at point 36 and has an actuating rod 38 pivoted to it at the point 40. The rod 38 engages the walking beam 32 by means of a roller 42. The walking beam is constrained to move in a roughly horizontal path by a link 44 which is pivoted to the bracket 24 at point 46. The point of engagement of the brake pedal push rod 38 with the walking beam is determined by a link 48 which is actuated by a control mechanism or servomechanism generally designated by the numeral 50. This control mechanism consists of a vacuum diaphragm housing comprising an upper half 52 and a lower half 54 between which are clamped a diaphragm and diaphragm plate 56, thus dividing the housing into two chambers 58 and 60.

A push rod 62 having a flange 63 is suitably attached to the diaphragm and diaphragm plate 56 and extends through one wall of the upper half of the housing 52 in a bearing or bushing 64. The upper end of the push rod 62 is pivotally connected to the previously mentioned link 48. A conduit 66 communicates the pressure in the engine intake manifold 68 of the vehicle to the vacuum chamber 60. A passage 70 extending through push rod 62 permits communication between chamber 58 and chamber 60. A valve 72 which is urged toward an unseated direction by a spring 74 may be moved upwardly to close the communication between the chamber 58 and passage 70.

A restricted orifice 76 is formed in the wall of the lower half 54 of the housing and permits a continuous flow of atmospheric air into chamber 58. A two dimensional cam 78, which in effect is a function generating mechanism, is pivoted on an axis 80 to which is also attached, by means of a lever 82, a mass or weight 84. This whole mechanism is positioned in the vehicle with the axis 80 horizontal and cross-wise of the vehicle so that deceleration in a forward direction causes the mass 84 to swing forward about the axis 80, thereby rotating the cam 78 and urging valve 72 upward to restrict the orifice 70. The mass of weight 84 and its supporting lever 82 and axis 80 constitute a decelerometer or deceleration measuring device.

The normal steady state condition of this system is established by the diaphragm 56 raising sufficiently away from the valve 72 to create an orifice so proportioned that a partial vacuum is maintained in the lower chamber 58 with full vacuum being maintained in the upper chamber 60 since it is in free communication with the manifold 68. In order to establish an equilibrium at this point, a spring 86 is compressed between the upper half 52 of the vacuum chamber and the diaphragm and diaphragm plate 56. The strength of this spring is proportioned to overcome the difference between the pressures in the two chambers times the effective area of the diaphragm.

In the graph shown in FIGURE 2, dotted line A represents a constant front to rear braking pressure ratio, solid line B represents a variable (optimum) braking pressure ratio, and the diagonal lines are drawn to represent varying conditions of $\mu$ which is the coefficient of friction of the road surface. When the mechanism is in its steady state location, the roller 42 engages the walking beam 32 at a point such that the ratio of leverages exerted by the walking beam against the master cylinder push rods 28 and 30 is equal to the slope of the ideal curve B at the point where $\mu$ equals 0.

If, for example, the brake is applied to produce a deceleration equal to .4 g. (13 ft./sec./sec.), which would be the optimum condition if the road coefficient $\mu$ happened to be .4, the mass 84 will swing forward to an angle at which the force of gravity acting downward equals the moment created by the force of deceleration in the horizontal direction.

The cam 78 is so proportioned that it will lift valve 72, thereby restricting orifice 70 and increasing vacuum in chamber 60. Upon such an occurrence the vacuum in chamber 58 simultaneously decreases because little air will pass through orifice 70, whereas atmospheric air will continue to enter through orifice 76. This change in pressure across the diaphragm will overcome the force of spring 86, thereby permitting the diaphragm to move upwardly together with push rod 62 and link 48 so as to reposition the point of engagement of roller 42 on the walking beam 32. As long as this condition of deceleration exists, a new point of equilibrium will be attained since the diaphragm will ultimately start moving away from the valve 72 and reestablish flow through orifice 70 so that an equilibrium of pressures in chambers 58 and 60 can be established against a new load of spring 86.

The repositioning of the point of contact of roller 42 on the walking beam 32 will cause a change in the lever ratio, thereby resulting in a different proportionate distribution of the brake pedal force between the master cylinder push rods 28 and 30. In other words, there will be an increase in the pressure transmitted to the front brakes and a decrease in the pressure transmitted to the rear brakes. This new ratio will be equivalent to the slope at the point of the curve B where $\mu$ equals .4.

By properly constructing the profile of the cam 78, it is possible to provide proportioning of the pressures to the front and rear wheel brakes through the entire range of operation conforming very closely to the optimum braking curve B and thus obtain optimum braking under every road surface condition.

Referring to FIGURES 3–6, it will be noted that a braking system of the type previously described is shown in conjunction with a function generating mechanism which is not only responsive to vehicle deceleration, but which is also responsive to vehicle load changes. In the embodiment shown in these figures like parts will be designated by like numerals plus 100.

In order to make the braking system of FIGURE 1 responsive to changes in vehicle load, it will be noted in FIGURE 3 that a three dimensional cam 178 is substituted in place of the two dimensional cam 78 of FIGURE 1. The surface of the cam is constructed so that it will have a plurality of cam profiles along the surface thereof, each of which is the desired cam profile for a given vehicle load condition, to provide the proper front to rear braking pressure ratio in accordance with predetermined ideal braking requirements for the given vehicle load. In order to move the cam from a lighter vehicle load position having a first predetermined cam profile in contact with roller 101 (as shown in FIGURE 3) to a heavier vehicle load position having a second predetermined cam profile in contact with roller 101 (as shown in FIGURE 4), a linkage arrangement, indicated generally by the numeral 103, is utilized. This linkage arrangement includes a rod 105 which is pivotally connected in a suitable manner at one end 107 to the vehicle body and a yoke-like member 109 which is pivotally connected in a suitable manner at point 111 to the vehicle axle. A cantilever spring 113 is suitably attached at one end to member 109 and piovtally connected in a suitable manner at the other end to rod 105. Thus, if the load in the vehicle is increased, the vehicle body and the rod 105, which is attached to the body, will move in a downward direction and cause the yoke-like member 109 to pivot about point 111. Such pivotal movement will cause the arms 115, 117 of the yoke to move in a leftward direction, as shown in FIGURE 4, and cause cam 178, which is attached to arms 115, 117 through pins 119 and annular groove 121, to likewise move in a leftward direction so that the desired predetermined cam profile for the specific vehicle load will be in the proper position for contact with roller 101. The cam 178 is positioned in the vehicle with its axis horizontal and cross-wise of the vehicle so that vehicle deceleration in a forward direction will cause the mass 184 to swing forward, thereby rotating cam 178 about fixed rod 180 and urging valve 172 upward to restrict the orifice 170. The servomechanism and walking beam arrangement of this embodiment will respond to movements of the mass 184 in the same manner described in connection with the FIGURE 1 embodiment. Thus, by utilizing a three dimensional cam as the function generating means in the braking system described, it is possible to obtain the ideal cam profile for a given vehicle load condition and utilize this cam profile to obtain optimum front to rear brake proportioning during vehicle deceleration. In order to prevent undesired movement of cam 178 from one position to another during the occurrence of intermittent road shocks, a damping means in the form of a dashpot 123 is suitably connected between the cam and the frame of the vehicle. The resistance of the dashpot to sudden movements is very high and consequently when road shocks cause sudden relative movement between the vehicle axle and the body, cantilever spring 113 deflects and no appreciable shifting of the cam 178 along its axis 180 occurs.

It will be understood that the term "acceleration" includes both positive and negative accelerations and that the term "deceleration" is equivalent to a negative acceleration. The terms "accelerometer" and "decelerometer" thus include devices responding to either positive or negative accelerations.

Although this invention has been described in connection with certain specific embodiments it will be obvious to those skilled in the art that various changes may be made in the form, structure, and arrangement of parts without departing from the spirit of the invention. Accordingly, we do not desire to be limited to the specific embodiment disclosed herein primarily for purposes of illustration but instead desire protection falling within the scope of the appended claims.

Having thus described the various features of the invention what we claim as new and desire to secure by Letters Patent is:

1. In a braking system for a vehicle having front and rear wheel braking means, the combination of pressure generating means for applying a braking pressure to said front and rear braking means, regulating means operatively connected to said pressure generating means for varying the braking pressure ratio between said front and rear wheel braking means, and means for automatically and continuously sensing the deceleration of the vehicle during application of said braking pressure and causing said regulating means to vary the braking pressure ratio between said front and rear wheel braking means as a function of said deceleration of the vehicle, said last named means comprising a servomechanism operatively connected to said regulating means for modifying the action thereof, an accelerometer for continuously measuring the deceleration of the vehicle, and function generating means operatively connected to said accelerometer and said servomechanism for receiving inputs from said accelerometer and programming outputs to said servomechanism so as to control the braking pressure ratio between said front and rear wheel braking means in accordance with predetermined ideal braking requirements.

2. A system, as defined in claim 1, which includes means operatively connected to said function generating means for varying the output thereof in accordance with the load carried by the vehicle.

3. A system, as defined in claim 1, wherein said regulating means includes a movable control member for varying the braking pressure ratio between said front and rear wheel braking means, and said servomechanism includes a pressure differential motor operatively connected to said control member for causing movement thereof and control valve means operatively connected to and responsive to said function generating means for controlling fluid pressure in said motor.

4. A system, as defined in claim 3, wherein said pressure differential motor includes a pressure responsive element fixedly connected to said movable control member.

5. A system, as defined in claim 4, wherein said control valve means includes passage means for permitting communication between one side of said pressure responsive element and the other side of said pressure responsive element, and a valve element for controlling flow through said passage means.

6. A system, as defined in claim 5, wherein said function generating means comprises cam means operatively connected to said valve element for causing movement thereof.

7. A system, as defined in claim 6, wherein said cam means includes a cam having a predetermined profile in abutment with said valve element, and said accelerometer includes a deceleration sensitive mass operatively connected to said cam for causing rotation of said cam and movement of said valve element in a direction tending to vary the flow through said passage means.

8. A system, as defined in claim 7, wherein said cam is a two dimensional cam which is responsive solely to vehicle deceleration.

9. A system, as defined in claim 7, wherein said cam is a three dimensional cam which is responsive to vehicle deceleration and vehicle load changes.

10. A system, as defined in claim 9, which includes linkage means for moving said cam from one position having a first predetermined cam profile in contact with said valve element to another position having a second predetermined cam profile in contact with said valve element, said position being determined by vehicle load changes.

11. A system, as defined in claim 10, which includes damping means for preventing movement of said cam from one position to another upon the occurrence of intermittent road shocks.

12. A system, as defined in claim 7, wherein said pressure generating means includes first and second fluid pressure generating means, the first of which communicates with said front wheel braking means and the second of which communicates with said rear wheel braking means.

13. A system, as defined in claim 12, wherein said regulating means includes linkage means for operatively connecting said first and second fluid pressure generating means with said movable control member, said linkage means comprising first and second movable operating members operatively connected to said first and second fluid pressure generating means respectively for generating pressure and displacing fluid to said front and rear wheel braking means in proportion to the force exerted by each of said operating members, a walking beam operatively connected to said first and second operating members, a roller operatively connected to said movable control member and engaging said walking beam between said first and second operating members, said movable control member causing movement of said roller on said walking beam between said first and second operating members, and brake pedal means operatively connected to said roller for transmitting a force thereto, said force being proportionally distributed and transmitted to said first and second operating members dependent on the position of said roller.

14. A system, as defined in claim 5, wherein the passage means for permitting communication between one side of said pressure responsive element and the other side of said pressure responsive element is located in said movable control member.

15. A system, as defined in claim 14, wherein the side of said pressure responsive element containing said movable member communicates with a vacuum pressure source and the other side of said pressure responsive element communicates with an atmospheric pressure source.

16. A system, as defined in claim 13, wherein said first and second fluid pressure generating means comprise first and second master cylinders and said first and second movable operating members are the push rods respectively associated therewith.

No references cited.

EUGENE G. BOTZ, *Primary Examiner.*